United States Patent
Choi

(10) Patent No.: US 9,966,617 B2
(45) Date of Patent: May 8, 2018

(54) FUEL CELL SYSTEM

(71) Applicant: HYUNDAI MOTOR COMPANY, Seoul (KR)

(72) Inventor: SungBum Choi, Seongnam-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 306 days.

(21) Appl. No.: 14/874,262

(22) Filed: Oct. 2, 2015

(65) Prior Publication Data

US 2016/0329583 A1    Nov. 10, 2016

(30) Foreign Application Priority Data

May 4, 2015    (KR) .................. 10-2015-0062659

(51) Int. Cl.
| | |
|---|---|
| *H01M 8/04223* | (2016.01) |
| *H01M 8/04955* | (2016.01) |
| *H01M 8/0432* | (2016.01) |
| *H01M 8/0258* | (2016.01) |
| *H01M 8/0267* | (2016.01) |

(52) U.S. Cl.
CPC ..... *H01M 8/04253* (2013.01); *H01M 8/0258* (2013.01); *H01M 8/0267* (2013.01); *H01M 8/0432* (2013.01); *H01M 8/04955* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 8,735,022 | B2* | 5/2014 | Schlag | H01M 8/0204 429/421 |
| 2005/0079397 | A1 | 4/2005 | Winkelmann et al. | |
| 2006/0088756 | A1* | 4/2006 | Sato | H01M 8/04089 429/410 |
| 2007/0031721 | A1* | 2/2007 | Winter | H01M 8/0228 429/210 |
| 2010/0247749 | A1* | 9/2010 | Abd Elhamid | B01D 67/0048 427/115 |
| 2015/0214561 | A1* | 7/2015 | Araki | H01M 8/04231 429/414 |

FOREIGN PATENT DOCUMENTS

| | | |
|---|---|---|
| JP | 2007-521619 A | 8/2007 |
| JP | 2008-034253 A | 2/2008 |

* cited by examiner

*Primary Examiner* — Tracy Dove
(74) *Attorney, Agent, or Firm* — McDermott Will & Emery LLP

(57) ABSTRACT

A fuel cell includes a membrane-electrode assembly, an anode separator and a cathode separator disposed at both sides of the membrane-electrode assembly, wherein the anode separator includes a hydrogen adsorption portion formed in a hydrogen reaction channel in which hydrogen flows.

7 Claims, 3 Drawing Sheets

FUEL CELL SYSTEM

CROSS-REFERENCE TO RELATED APPLICATION

This application claims priority to Korean Patent Application No. 10-2015-0062659, filed on May 4, 2015 with the Korean Intellectual Property, the entire contents of which are incorporated herein by reference.

TECHNICAL FIELD

An exemplary embodiment of the present disclosure relates to a fuel cell system. More particularly, the present disclosure relates to a fuel cell, and a fuel cell system, for enhancing cold start performance.

BACKGROUND

A fuel cell system is a kind of power generation system for generating electric energy via an electrochemical reaction between hydrogen and oxygen by a fuel cell. In general, fuel cell systems have been applied to fuel cell vehicles.

The fuel cell of the fuel cell system is configured by disposing separators (separating plates or bipolar plates) at both sides of a membrane-electrode assembly (MEA). The separator may form a reaction channel for supplying hydrogen and air to the membrane-electrode assembly and a cooling channel for circulating a coolant. The fuel cell generates electric energy via an electrochemical reaction between hydrogen and air and incidentally generates heat and water.

However, during the winter season with a low external temperature, water may be locally frozen in the reaction channel of the separator, causing ice that blocks the flow of hydrogen and air that move along the reaction channel.

If the reaction channel of the separator is clogged by ice blocking at the time of cold starting the fuel cell, the amount of hydrogen supplied to the membrane-electrode assembly through the reaction channel can be low.

According to conventional art, as hydrogen supplied to a membrane-electrode assembly becomes insufficient, the membrane-electrode assembly is non-reversibly degraded. This can degrade the performance of a fuel cell.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a fuel cell and a fuel cell system having advantage of preventing degradation of a fuel cell due to insufficient hydrogen supply at the time of a cold start.

An exemplary embodiment of the present disclosure provides a fuel cell including a membrane-electrode assembly, and an anode separator and a cathode separator disposed at both sides of the membrane-electrode assembly, wherein the anode separator includes a hydrogen adsorption portion formed in a hydrogen reaction channel in which hydrogen flows.

The hydrogen adsorption portion may include a hydrogen adsorption layer formed by coating a hydrogen adsorption material on a channel surface of the hydrogen reaction channel, and the hydrogen adsorption layer may adsorb hydrogen and cause an exothermal reaction.

The hydrogen adsorption material may be metal hydride.

The anode separator may form land portions closely adhered to a side of an anode of the membrane-electrode assembly, the hydrogen reaction channel may be formed between the land portions, and the hydrogen adsorption layer may be formed on a channel surface of the hydrogen reaction channel except for the land portion.

Another embodiment of the present disclosure provides a fuel cell system including a fuel cell stack in which a plurality of fuel cells are stacked, a reaction gas supplier supplies hydrogen and oxygen to the fuel cell stack, and a controller receiving an atmospheric temperature detected by an atmospheric temperature sensor and a coolant temperature detected by a coolant temperature sensor, wherein the fuel cell includes a membrane-electrode assembly, and an anode separator and a cathode separator are disposed at both sides of the membrane-electrode assembly, and the anode separator includes a hydrogen adsorption portion formed in a hydrogen reaction channel in which hydrogen flows.

The hydrogen adsorption portion may include a hydrogen adsorption layer formed by coating a hydrogen adsorption material on a channel surface of the hydrogen reaction channel, and the hydrogen adsorption material may adsorb hydrogen and is metal hydride causing an exothermal reaction.

The anode separator may form land portions closely adhered to a side of an anode of the membrane-electrode assembly, the hydrogen reaction channel may be formed between the land portions, and the hydrogen adsorption layer may be formed on a channel surface of the hydrogen reaction channel except for the land portions.

If an atmospheric temperature at the time of starting the fuel cell is equal to or less than a first predetermined temperature, the controller may supply hydrogen to the hydrogen reaction channel at a first predetermined pressure.

The anode separator and the cathode separator may form a cooling channel for circulating a coolant, and if a coolant temperature is equal to or less than a second predetermined temperature, the controller may pressurize hydrogen at a second predetermined pressure greater than the first predetermined pressure and supplies the hydrogen to the hydrogen reaction channel.

According to an exemplary embodiment of the present disclosure, hydrogen may be supplied to the hydrogen reaction channel of the anode separator at the time of cold starting under a low temperature condition so as to prevent ice blocking of the anode separator via an exothermic reaction of the hydrogen adsorption layer.

Accordingly, degradation of the fuel cell due to insufficient hydrogen supply according to ice blocking of the anode separator may be prevented and cold start performance of a fuel cell vehicle may be enhanced.

BRIEF DESCRIPTION OF THE DRAWINGS

The accompanying drawings, which are included to provide a further understanding of the disclosure, illustrate exemplary embodiments of the disclosure but exemplary embodiments of the present disclosure should not be construed as limited to the accompanying drawing.

DETAILED DESCRIPTION

Figure 1:
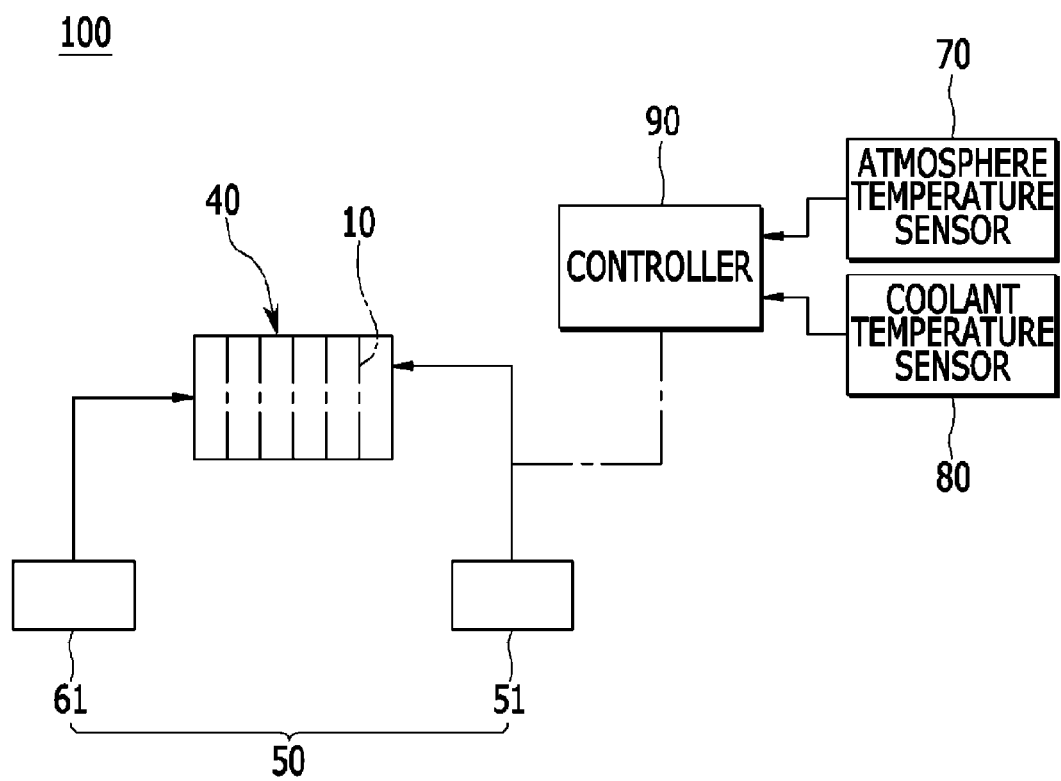
FIG. 1 is a block diagram illustrating a fuel cell system according to an exemplary embodiment of the present disclosure.

Hereinafter, the present disclosure will be described more fully hereinafter with reference to the accompanying drawings, in which exemplary embodiments of the disclosure are shown.

As those skilled in the art would realize, the described embodiments may be modified in various different ways, all without departing from the spirit or scope of the present disclosure.

To clearly describe the present disclosure, a part without concerning to the description is omitted in the drawings, and the same or like reference numerals in the specification denote like elements.

Sizes and thicknesses of the elements shown in the drawings are for the purpose of descriptive convenience, and thus the present disclosure is not necessarily limited thereto and a thickness is enlarged to clarify various parts and regions.

Terms such as first, second, etc. may be used to describe various elements, but these terms do not limit the order of elements and are used only to classify one element from another.

Throughout the specification, unless explicitly described to the contrary, the word "comprise" and variations such as "comprises" or "comprising" will be understood to imply the inclusion of stated elements but not the exclusion of any other elements.

Throughout the specification, the word "-unit", "-means", "-er", "-member" or the like will be understood as a broadly configured unit for performing at least one function or operation.

FIG. 1 is a block diagram illustrating a fuel cell system according to an exemplary embodiment of the present disclosure.

Referring to FIG. 1, the fuel cell system 100 according to an exemplary embodiment of the present disclosure includes a fuel cell stack 40 including a plurality of fuel cells 10 stacked therein, and a reaction gas supplier 50 for supplying hydrogen as fuel and air as an oxidizing agent (hereinafter, referred to as "reaction gas") to the fuel cell stack 40. In addition, the fuel cell system 100 includes a controller 90 for controlling an overall operation of an entire system.

Here, a reaction gas supplier 50 includes a hydrogen supplier 51 for supplying hydrogen to the fuel cell stack 40 and an air supplier 61 for supplying air to the fuel cell stack 40. The fuel cell 10 included in the fuel cell stack 40 generates electric energy via electrochemical reaction between hydrogen and air provided from the reaction gas supplier 50 and generates heat and water as reaction byproducts.

The controller 90 may be implemented with one or more microprocessors executed by a predetermined program. The predetermined program may include a series of commands for performing each step included in a method for controlling the fuel cell system according to an exemplary embodiment of the present disclosure to be described below.

Figure 2:
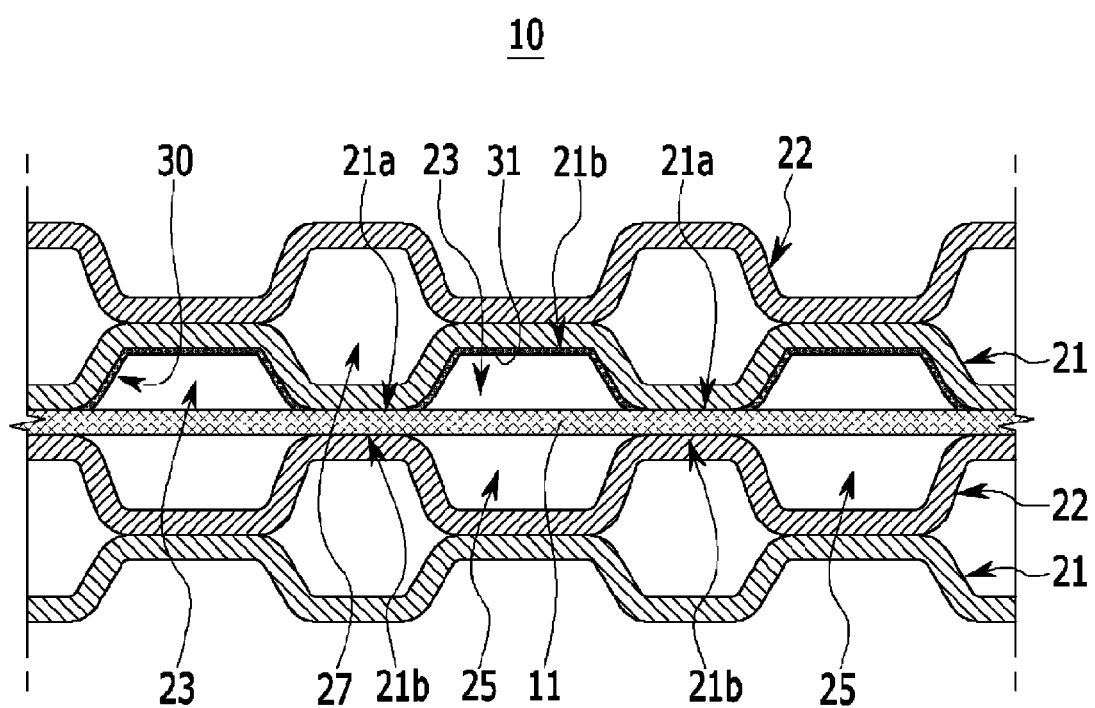
FIG. 2 is a cross-sectional view of a fuel cell applied to the fuel cell system according to an exemplary embodiment of the present disclosure.

FIG. 2 is a cross-sectional view of the fuel cell applied to the fuel cell system according to an exemplary embodiment of the present disclosure.

Referring to FIG. 2, the fuel cell 10 according to an exemplary embodiment of the present disclosure includes a membrane-electrode assembly (MEA) 11 and separators 21 and 22 disposed at both sides of the membrane-electrode assembly 11.

The membrane-electrode assembly 11 includes an electrolyte membrane, an anode ("hydrogen electrode") formed on one surface of the electrolyte membrane and a cathode ("air electrode") formed on the other surface of the electrolyte membrane. Here, each anode and cathode may include a gas diffusion layer.

The separators 21 and 22 supply hydrogen and air to the membrane-electrode assembly 11. For example, the separators 21 and 22 may be metal separators made of materials having electric conductivity. The separators 21 and 22 may form channels 23 and 25 for circulating hydrogen and air and a channel 27 for circulating a coolant.

The anode separator 21 forms the hydrogen reaction channel 23 for circulating hydrogen and is tightly adhered to a side of an anode of the membrane-electrode assembly 11. The cathode separator 22 forms the air reaction channel 25 for circulating air and is tightly adhered to a side of a cathode of the membrane-electrode assembly 11.

The separators 21 and 22 form land portions 21a and 22a that are closely adhered to sides of the anode and cathode of the membrane-electrode assembly 11. Here, the hydrogen reaction channel 23 may be formed between the land portions 21a, and the air reaction channel 25 may be formed between the land portions 22a. In addition, the separators 21 and 22 form the cooling channel 27 for circulating a cooling medium (e.g., coolant).

In the above configured fuel cell system 100, under a low temperature condition during the winter season with a low external temperature, ice blocking may occur whereby water present in the hydrogen reaction channel 23 of the anode separator 21 is locally frozen and blocks the flow of the reaction gas circulating along the reaction channel.

The fuel cell system 100 according to an exemplary embodiment of the present disclosure is configured to prevent the fuel cell 10 from being degraded due to insufficient hydrogen supply caused by ice blocking at the time of cold starting.

To this end, the anode separator 21 of the fuel cell 10 applied to the fuel cell system 100 according to an exemplary embodiment of the present disclosure includes a hydrogen adsorption portion 30 formed in the hydrogen reaction channel 23 in which hydrogen flows.

The hydrogen adsorption portion 30 melts ice that is locally frozen in the hydrogen reaction channel 23 of the anode separator 21 via chemical exothermic reaction at the time of cold starting during the winter season with a low external temperature.

That is, the hydrogen adsorption portion 30 may react with hydrogen supplied to the hydrogen reaction channel 23 of the anode separator 21 to generate heat while adsorbing hydrogen, and melt ice that is locally frozen in the hydrogen reaction channel 23 by the reaction heat.

The hydrogen adsorption portion 30 includes a hydrogen adsorption layer 31 that is coated and formed on the hydrogen reaction channel 23 of the anode separator 21. The hydrogen adsorption layer 31 is formed by coating or applying a hydrogen adsorption material on the hydrogen reaction channel 23 of the anode separator 21 and formed on a channel surface 21b of the hydrogen reaction channel 23 except for the land portion 21a of the anode separator 21. The hydrogen adsorption material may adsorb hydrogen and include metal hydride that causes an exothermal reaction.

As an example of a method for forming the hydrogen adsorption layer 31, the channel surface 21b of the hydrogen reaction channel 23 may be exposed using a masking tape and a hydrogen adsorption material may be deposited on the channel surface 21b of the hydrogen reaction channel 23 via a sputtering deposition method to form the hydrogen adsorption layer 31.

As another example of the method for forming the hydrogen adsorption layer 31, the channel surface 21b of the hydrogen reaction channel 23 may be exposed using a masking tape and a hydrogen adsorption material may be coated on the channel surface 21b of the hydrogen reaction channel 23 via a spray coating method to form the hydrogen adsorption layer 31.

Here, the hydrogen adsorption layer 31 may be formed on the channel surface 21b of an entire area of the hydrogen reaction channel 23 or the channel surface 21b of a partial area of the hydrogen reaction channel 23. In addition, the hydrogen adsorption layer 31 is formed on the channel surface 21b of the hydrogen reaction channel 23 except for the land portion 21a of the anode separator 21 because, when the hydrogen adsorption layer 31 is formed on the land portion 21a, contact resistance between the anode separator 21 and the membrane-electrode assembly 11 deteriorates.

Hereinafter, an operation of the above configured fuel cell system 100 according to an exemplary embodiment of the present disclosure will be described in detail with reference to the above drawings and the following FIG. 3.

Figure 3:
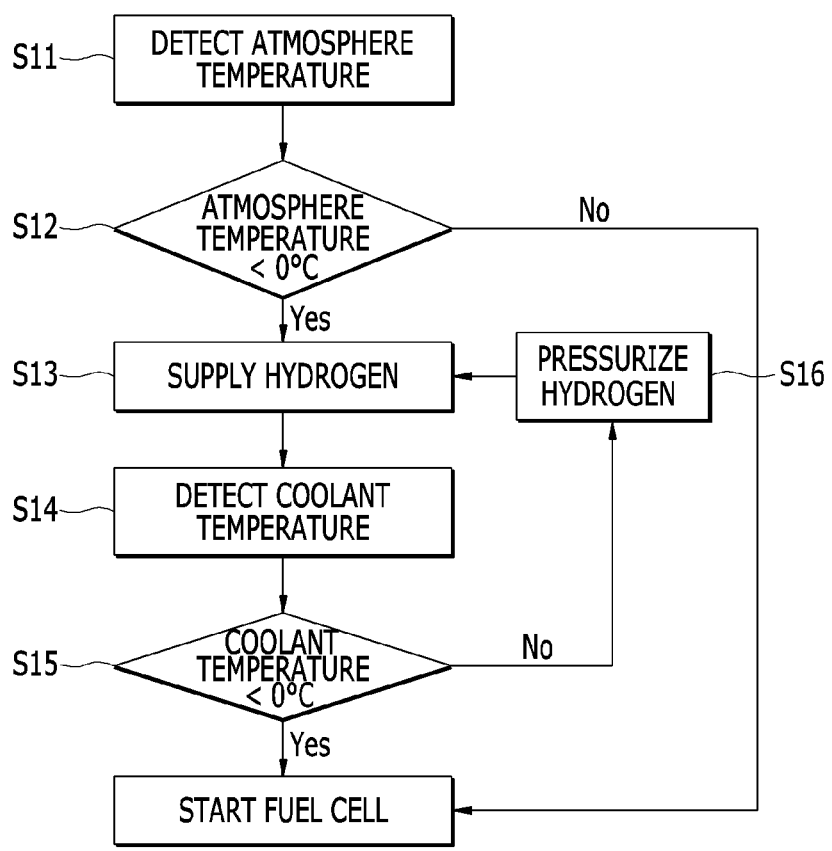
FIG. 3 is a flowchart for explanation of an operation of a fuel cell system according to an exemplary embodiment of the present disclosure.

FIG. 3 is a flowchart for explanation of an operation of a fuel cell system according to an exemplary embodiment of the present disclosure.

Referring to FIGS. 1 to 3, first, according to an exemplary embodiment of the present disclosure, an atmospheric temperature sensor 70 detects an atmospheric temperature and outputs a detection signal to the controller 90 (S11). If the atmospheric temperature at the time of starting the fuel cell 10 is equal to or less than a first predetermined temperature (e.g., 0° C.) (S12), the controller 90 supplies hydrogen to the hydrogen reaction channel 23 of the anode separator 21 (S13). In this case, the controller 90 may supply hydrogen to the hydrogen reaction channel 23 through the hydrogen supplier 51 at a first predetermined pressure. Then the hydrogen adsorption layer 31 coated on the channel surface 21b of the hydrogen reaction channel 23 generates heat while reacting with hydrogen to be adsorbed to the hydrogen.

Accordingly, at the time of cold starting under a low temperature condition (at an atmospheric temperature equal to or less than 0° C.), ice that is locally frozen in the hydrogen reaction channel 23 of the anode separator 21 may be melted by reaction heat of the hydrogen adsorption layer 31.

Through this process, a coolant temperature sensor 80 detects a coolant temperature and outputs a detection signal to the controller 90 (S14). If the coolant temperature at the time of starting the fuel cell 10 is equal to or less than a second predetermined temperature (e.g., 0° C.) (S15), the controller 90 pressurizes hydrogen with a second predetermined pressure greater than the first predetermined pressure and supplies the hydrogen to the hydrogen reaction channel 23 through the hydrogen supplier 51 (S16).

Accordingly, hydrogen is adsorbed to the hydrogen adsorption layer 31 of the hydrogen reaction channel 23 to continuously generate heat and ice frozen in the hydrogen reaction channel 23 with relatively wide distribution may be melted by reaction heat of the hydrogen adsorption layer 31.

Accordingly, at the time of cold starting under a low temperature condition, ice frozen in the hydrogen reaction channel 23 may be removed by the reaction heat of the hydrogen adsorption layer 31 such that the hydrogen adsorption layer 31 secures a path in which hydrogen flows, thereby smoothly supplying hydrogen to the membrane-electrode assembly 11.

According to an exemplary embodiment of the present disclosure, after a predetermined amount of hydrogen is adsorbed to the hydrogen adsorption layer 31 of the hydrogen reaction channel 23, an exothermic reaction does not proceed any longer, and when a coolant temperature becomes a temperature above zero degree, normal start is performed.

By virtue of the fuel cell system 100 that has been described thus far with regard to an exemplary embodiment of the present disclosure, hydrogen may be supplied to the hydrogen reaction channel 23 of the anode separator 21 at the time of cold starting under a low temperature condition so as to prevent ice blocking of the anode separator 21 via an exothermic reaction of the hydrogen adsorption layer 31.

According to an exemplary embodiment of the present disclosure, degradation of the fuel cell 10 due to insufficient hydrogen supply caused by ice blocking of the anode separator 21 at the time of cold starting under a low temperature condition may be prevented and cold start performance of a fuel cell vehicle may be enhanced.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A fuel cell comprising:
   a membrane-electrode assembly;
   an anode separator and a cathode separator disposed at both sides of the membrane-electrode assembly,
   wherein the anode separator includes a hydrogen adsorption portion formed in a hydrogen reaction channel in which hydrogen flows,
   wherein the hydrogen adsorption portion includes a hydrogen adsorption layer, the hydrogen adsorption layer having a hydrogen adsorption material on a channel surface of the hydrogen reaction channel, and
   wherein the hydrogen adsorption material is metal hydride.

2. The fuel cell of claim 1, wherein the hydrogen adsorption layer adsorbs hydrogen and causes an exothermal reaction.

3. The fuel cell of claim 1, wherein the anode separator forms land portions closely adhered to a side of an anode of the membrane-electrode assembly, the hydrogen reaction channel is formed between the land portions, and the hydrogen adsorption layer is formed on the channel surface of the hydrogen reaction channel except for the land portions.

4. A fuel cell system comprising:
   a fuel cell stack in which a plurality of fuel cells are stacked;
   a reaction gas supplier supplying hydrogen and oxygen to the fuel cell stack; and
   a controller receiving an atmospheric temperature detected by an atmospheric temperature sensor and a coolant temperature detected by a coolant temperature sensor, wherein the fuel cell includes a membrane-electrode assembly, and an anode separator and a cathode separator are disposed at both sides of the membrane-electrode assembly, wherein the anode separator includes a hydrogen adsorption portion formed in a hydrogen reaction channel in which hydrogen flows, and wherein the hydrogen adsorption portion includes a hydrogen adsorption layer, the hydrogen adsorption layer having a hydrogen adsorption material on a channel surface of the hydrogen reaction channel, and wherein the hydrogen adsorption material adsorbs hydrogen and is metal hydride causing an exothermal reaction.

5. The fuel cell system of claim 4, wherein the anode separator forms land portions closely adhered to a side of an anode of the membrane-electrode assembly, the hydrogen reaction channel is formed between the land portions, and the hydrogen adsorption layer is formed on the channel surface of the hydrogen reaction channel except for the land portions.

6. The fuel cell system of claim 4, wherein if an atmospheric temperature at the time of starting the fuel cell is equal to or less than a first predetermined temperature, the controller supplies hydrogen to the hydrogen reaction channel at a first predetermined pressure.

7. The fuel cell system of claim 6, wherein the anode separator and the cathode separator form a cooling channel for circulating a coolant, and if a coolant temperature is equal to or less than a second predetermined temperature, the controller pressurizes hydrogen with a second predetermined pressure greater than the first predetermined pressure and supplies the hydrogen to the hydrogen reaction channel.

* * * * *